US010305713B2

(12) United States Patent
Stott (10) Patent No.: US 10,305,713 B2
(45) Date of Patent: May 28, 2019

(54) TRIGGER INFORMATION EXCHANGE BETWEEN WIRELESS SYSTEMS

(71) Applicant: Ixia, Calabasas, CA (US)

(72) Inventor: Lester Noel Stott, Aloha, OR (US)

(73) Assignee: KEYSIGHT TECHNOLOGIES SINGAPORE (SALES) PTE. LTD., Singapore (SG)

( * ) Notice: Subject to any disclaimer, the term of this patent is extended or adjusted under 35 U.S.C. 154(b) by 226 days.

(21) Appl. No.: 14/927,365

(22) Filed: Oct. 29, 2015

(65) Prior Publication Data

US 2017/0126450 A1    May 4, 2017

(51) Int. Cl.
*H04L 27/26* (2006.01)
*H04B 7/26* (2006.01)
*H04W 84/12* (2009.01)

(52) U.S. Cl.
CPC ........... *H04L 27/2613* (2013.01); *H04B 7/26* (2013.01); *H04W 84/12* (2013.01)

(58) Field of Classification Search
CPC . H04B 7/0452; H04L 27/2613; H04L 5/0023; H04W 74/006; H04W 84/12
USPC ........................................................ 370/329
See application file for complete search history.

(56) References Cited

U.S. PATENT DOCUMENTS

| 2016/0014804 A1* | 1/2016 | Merlin | H04L 5/0044 |
| | | | 370/329 |
| 2016/0057657 A1* | 2/2016 | Seok | H04L 69/324 |
| | | | 370/476 |
| 2016/0330007 A1* | 11/2016 | Cherian | H04L 5/0055 |

OTHER PUBLICATIONS

"Introduction to 802.11ax High-Efficiency Wireless," National Instruments White Paper, pp. 1-11 (Apr. 20, 2017).

* cited by examiner

*Primary Examiner* — Mark H Rinehart
*Assistant Examiner* — Kokou R Detse (57) ABSTRACT

Systems and methods are disclosed herein to provide efficient support for the exchange of trigger information between wireless data communication devices and systems, including Multi-User Multiple Input Multiple Output (MU-MIMO) devices and systems that may utilize Orthogonal Frequency Division Multiple Access (OFDMA). In accordance with one or more embodiments, a trigger information exchange mechanism is disclosed that transfers trigger data as part of a pre-existing data frame handshake. Such a system may offer improved capabilities such as a reduced channel overhead incurred due to the trigger information exchange.

10 Claims, 8 Drawing Sheets

TRIGGER INFORMATION EXCHANGE BETWEEN WIRELESS SYSTEMS

TECHNICAL FIELD

The subject matter described herein relates generally to wireless data communication systems; and more particularly to systems and methods for transferring trigger information between wireless devices, including but not limited to multi-user multiple-input multiple-output data communication devices and systems.

BACKGROUND

There is increasing need for higher data rates, better efficiency, and support for larger numbers of users in the sophisticated wireless data communications devices that are deployed worldwide. For example, the IEEE 802.11 Wireless Local Area Network (WLAN) systems that have achieved widespread use utilize Multiple Input Multiple Output (MIMO) techniques to increase communication data rates and hence support greater data traffic to larger numbers of users. Further advances in WLAN systems utilize Multi-User MIMO (MU-MIMO) techniques to allow concurrent transmissions to be made in the downstream direction from IEEE 802.11 Access Points (APs) to client devices. This significantly improves the efficiency of the system and the utilization of the wireless channel.

Figure 1:
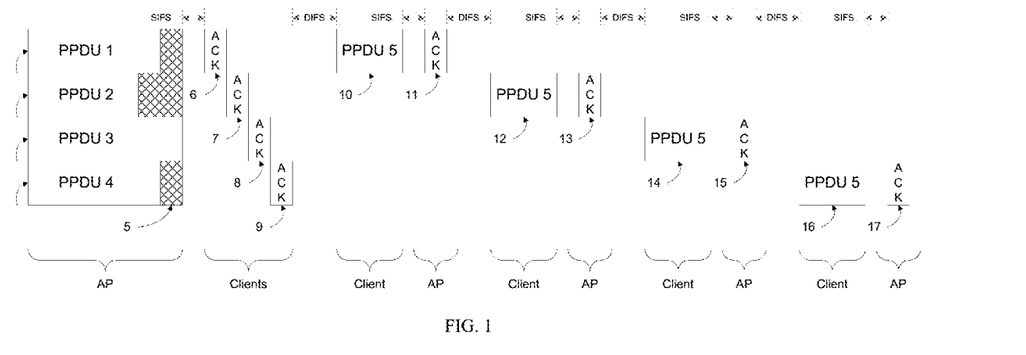
FIG. 1—representative packet exchange sequence for an exemplary MU-MIMO downstream and upstream transmission.

FIG. 1 illustratively represents an MU-MIMO data transfer process as may be implemented in an MU-MIMO IEEE 802.11 protocol such as IEEE 802.11ac. For descriptive purposes FIG. 1 depicts a possible downstream MU-MIMO data transfer by the AP followed by upstream data transfers by the clients. The downstream MU-MIMO frames (Physical layer Protocol Data Units, or PPDUs) simultaneously transmitted by the AP in one block are 1, 2, 3, 4, with padding 5 being used to pad out the PPDUs to the same transmission duration. PPDUs 1, 2, 3, 4 are transmitted to four different clients at the same time. After the AP transmits these PPDUs, the corresponding clients return Acknowledgements 6, 7, 8 and 9 respectively, waiting a Short Interframe Space (SIFS) from the AP's PPDUs. The clients now transmit data upstream to the AP as their own PPDUs 10, 12, 14, 16, waiting the appropriate Distributed Coordination Function Interframe Spacing (DIFS) and SIFS intervals, and receiving Acknowledgement frames 11, 13, 15, 17, as dictated by the IEEE 802.11 protocol. As MU-MIMO does not support concurrent upstream transmissions, the clients are forced to send their PPDUs 10, 12, 14, 16 separately.

It is evident from FIG. 1 that while substantial efficiency is possible in the downstream direction from the AP to clients by virtue of MU-MIMO, the upstream direction does not enjoy such efficiencies. Current technology improvements in IEEE 802.11 are adopting advanced techniques such as Orthogonal Frequency Division Multiple Access (OFDMA) to permit concurrent transmissions to also be made in the upstream direction from IEEE 802.11 client devices to APs. This further improves the ability of a WLAN system to support many concurrently active client devices on each AP.

Figure 2:
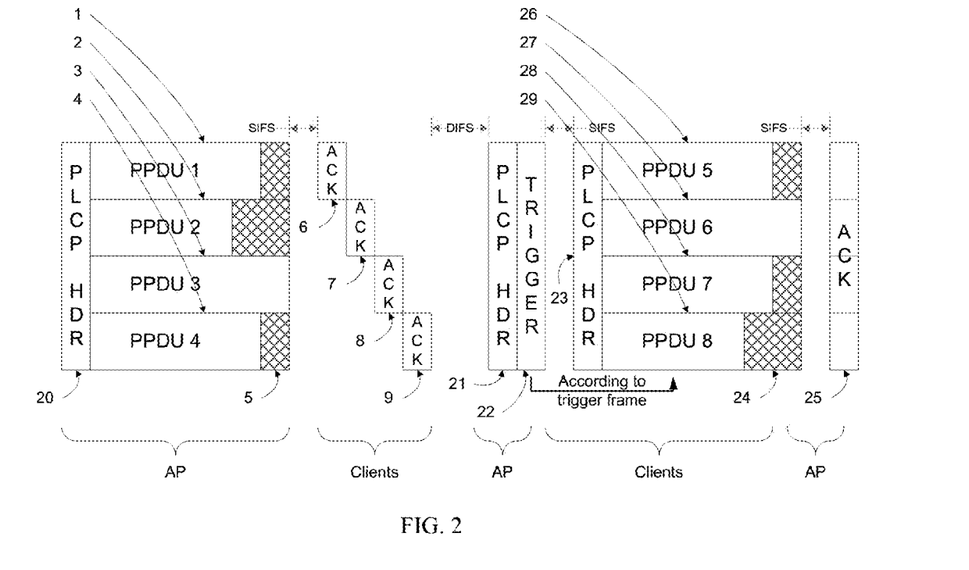
FIG. 2—representative packet exchange sequence for an exemplary MU-MIMO downstream and OFDMA upstream transmission.

FIG. 2 represents for descriptive purposes an MU-MIMO exchange employing OFDMA in the upstream direction. As in the preceding case, the AP utilizes MU-MIMO techniques to transmit PPDUs 1, 2, 3, 4, padded with padding 5 (and preceded by Physical Layer Convergence Protocol, or PLCP, header 20), to four clients. The clients also return their Acknowledgements 6, 7, 8, 9 after waiting a SIFS in the usual manner. However, in the upstream direction the AP first transmits a special trigger frame 22 (which has a PLCP header 21), which triggers a subset of clients to synchronize to each other and simultaneously transmit their PPDUs 26, 27, 28, 29 as a single OFDMA burst. The OFDMA frame has a PLCP header 23—transmitted by all clients simultaneously—as well as padding 24 to ensure that all clients transmit for an equal amount of time. The AP then returns a composite Acknowledgement 25 to all of the clients, indicating proper reception and acceptance of PPDUS 26, 27, 28, 29.

Trigger frame 22 plays several important roles in the OFDMA transmission. Firstly, it provides a common synchronization reference for all of the clients, which is required in order for the clients to align their OFDMA symbols with each other so that the AP can properly receive and decode them. Secondly, the trigger frame allows the AP to control which specific clients must transmit data upstream, thereby ensuring that the AP will be able to decode the client data when it is received. Finally, the trigger frame supplies critical parameters such as Transmit Opportunity (TXOP) duration, buffer state information, QoS state, etc. that the clients will need to know in order to control their OFDMA transmissions.

Figure 3:
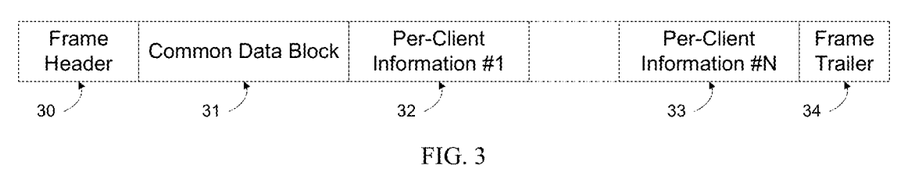
FIG. 3—representative example of a possible trigger frame used to trigger one or more clients to perform an OFDMA upstream transmission.

A possible example of trigger frame 22 is shown in FIG. 3. As represented, trigger frame 22 may comprise an IEEE 802.11 frame header 30, followed by a block of common data 31. This data may provide parameters such as TXOP duration and buffer state information that is required by all clients wishing to send upstream data. Following common data block 31, individual client information blocks 32, 33 may encode per-client data. The per-client data may indicate the specific client that is required to transmit upstream data at a specified time after the receipt of this trigger frame, as well as any client-specific parameters or control information that may be needed. Finally, a standard IEEE 802.11 frame trailer 34 may be located at the end of the trigger frame.

It will be apparent from FIG. 2 that a significant improvement in efficiency is obtained by the use of OFDMA in the upstream direction. Instead of each client having to transmit its PPDU individually, and also insert SIFS and DIFS spacings between the various PPDUs, it is possible for the clients to concurrently use the same radio channel to send all their PPDUs at the same time. Also, the AP can transmit a single Acknowledgement packet 25 concurrently acknowledging receipt of the four PPDUs to all four clients in one frame, further improving the efficiency and eliminating much of the delays due to the SIFS gaps.

However, the use of trigger frame 22 still has some significant limitations on efficiency. According to the IEEE 802.11 protocol, the AP must wait for at least a DIFS time before attempting to regain the medium after the clients return their Acknowledgement frames 6, 7, 8, 9. Further, the transmission of trigger frame 22 has its own overhead in terms of a PLOP header, and the transmission of the OFDMA frames by the clients cannot occur until at least a SIFS time after the trigger frame is received. When a large number of frame exchanges are occurring over a relatively short period, as would be common for high-bandwidth exchanges between the AP and its clients, these overheads can become substantial, resulting in a significant drop in efficiency and a reduction in usable channel capacity. The known prior art therefore suffers from serious shortcomings with regard to attaining the best efficiency for OFDMA operations. There is hence a need for improved wireless data communication test systems and methods. A system that is capable of reducing the overhead of trigger frames is desirable.

SUMMARY

One aspect of the subject matter described herein includes a method for communicating trigger information for time overlapping multiple access uplink wireless communications. The method includes steps performed at a wireless access point including at least one processor. The method includes generating trigger information for triggering clients to transmit uplink data units with overlapping timing to the wireless access point over a multiple access wireless medium. The method further includes generating downlink data units and inserting the trigger information in the downlink data units. The method further includes transmitting the downlink data units including the trigger information to the clients over the multiple access wireless medium. The method further includes receiving the uplink data units transmitted by the clients over the multiple access wireless medium with overlapping timing determined using the trigger information.

As used herein, the term "uplink data units" refers to frames to be transmitted from client devices to a wireless access point over the air interface. The term "downlink data units" refers to frames to be transmitted from a wireless access point to one or more clients over the air interface.

According to another aspect of the subject matter described herein, A system for communicating trigger information for time overlapping multiple access uplink wireless communications is provided. The system includes a wireless access point. The wireless access point includes at least one processor. The wireless access point includes a trigger information generator implemented by the at least one processor for generating trigger information for triggering clients to transmit uplink data units with overlapping timing to the wireless access point over a multiple access wireless medium. The wireless access point includes a downlink data unit generator for generating downlink data units and inserting the trigger information in the downlink data units. The wireless access point further includes a wireless transceiver for transmitting the downlink data units including the trigger information to the clients over the multiple access wireless medium and for receiving the uplink data units transmitted by the clients over the multiple access wireless medium with overlapping timing determined using the trigger information.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Note that like reference numbers are used to identify like elements illustrated in the different drawings.

DETAILED DESCRIPTION

Figure 4:
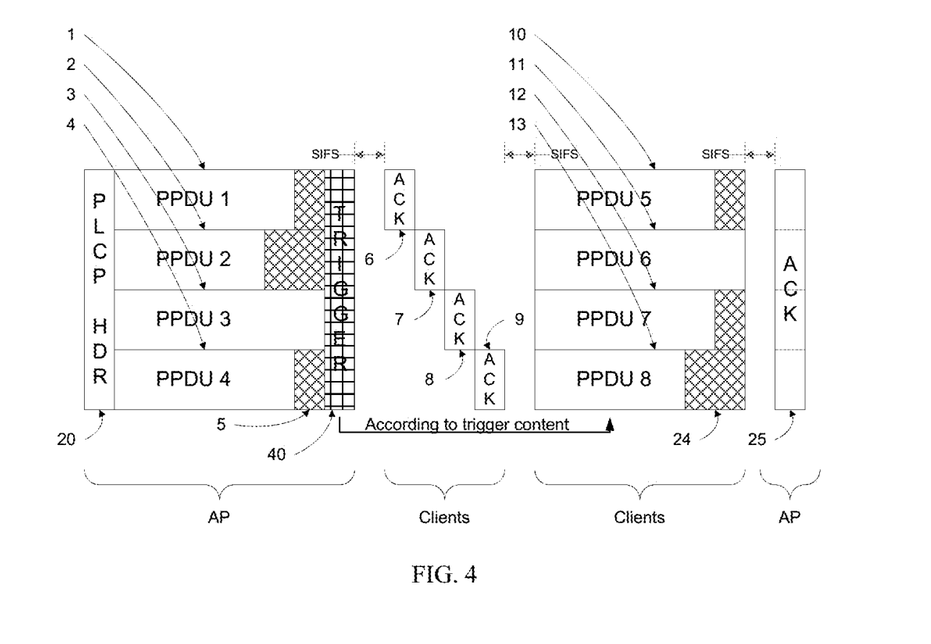
FIG. 4—packet exchange sequence for an OFDMA upstream transmission where the trigger information is integrated into the trailer of the downstream data frame.

FIG. 4 shows an illustrative depiction of a frame exchange sequence wherein the downstream data transferred from the AP to four clients is performed using MU-MIMO and the upstream data transferred from four clients to the AP is performed using OFDMA. As shown, the downstream data frame set begins with PLOP header 20 followed by four data PPDUs 1, 2, 3, 4, each padded out to the same transmission duration by padding 5. Padding 5 is then followed by trigger information element 40, which triggers a subsequent upstream transmission by some selected set of clients. After the downstream data transmission by the AP has terminated, the target clients wait for a SIFS time and return their Acknowledgements 6, 7, 8, 9. In response to trigger information 40, the selected clients transmit OFDMA PPDUs 10, 11, 12, 13 to the AP a SIFS time after the last Acknowledgement, including padding 24. Another SIFS time after the upstream frame transmission completes, the AP returns a composite Acknowledgement for all upstream PPDUs as frame 25, thereby terminating the handshake.

Trigger information element 40 in FIG. 4 comprises one or more symbols encoding trigger data that are placed within the downstream MU-MIMO frame by the AP. The trigger information element performs the same synchronization and control parameter notification that trigger frame 22 in FIG. 2 performs. Synchronization is achieved by encoding data that instructs all of the clients selected for upstream data transfer to begin their transmissions at a predetermined time relative to the start of trigger information element 40. As all clients receive and decode the trigger information element, all of the selected clients are able to synchronize their transmissions precisely relative to each other. Further, trigger information element 40 can be encoded with all of the necessary information such as TXOP duration and client selection that was previously encoded by trigger frame 22 in FIG. 2. Therefore, the arrangement of FIG. 4 accomplishes the same functions as that of FIG. 2.

The transmission of trigger information element 40 in FIG. 4 clearly incurs much less overhead than the transmission of an entirely separate trigger frame as in FIG. 2. For example, the AP is not required to transmit the trigger data as an entirely separate frame, thereby avoiding the need to wait for a DIFS time period and potentially losing control of the medium to another 802.11 device. Also, the trigger frame contains its own PLOP header, and there must be a gap of at least one SIFS time between the trigger frame and the succeeding data frames. All of these overhead items are eliminated by the transmission of trigger information element 40 as part of a preceding downstream data frame, rather than as a separate trigger frame 22. Clearly this can result in a substantially enhanced data throughput and increased channel utilization.

Figure 5:
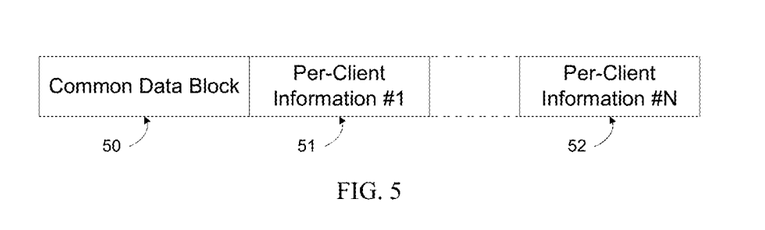
FIG. 5—representative example of a trigger information element used as trigger information integrated into the downstream data frame.

FIG. 5 shows a possible format for trigger information element 40 of FIG. 4. As seen, it may consist of a common data block 50 and one or more per-client blocks 51, 52. These correspond to common data block 31 and per-client information blocks 32, 33 of FIG. 3; however, as this is an information element within a frame and not a separate frame, there is no requirement for a frame header or frame trailer. Again, common data block 50 encodes information such as TXOP duration that is required by all clients, and per-client data blocks 51, 52 encode client-specific transmit control data as well as per-client parameters.

Figure 6:
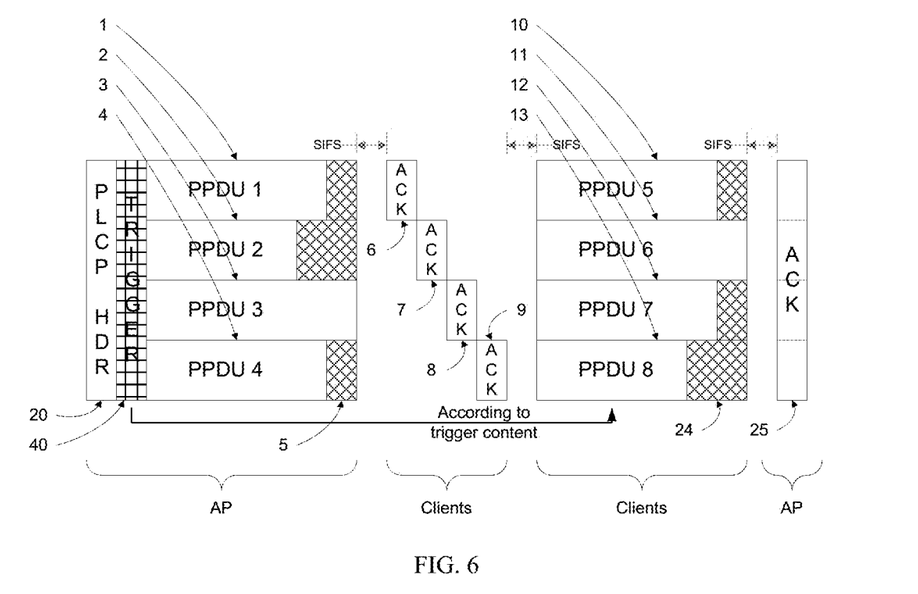
FIG. 6—packet exchange sequence for an OFDMA upstream transmission where the trigger information is integrated into the PLOP header of the downstream data frame.

FIG. 6 depicts an alternative method of transmitting trigger data from the AP to the clients. In this case, trigger information element 40, again comprising one or more symbols encoding trigger data, immediately succeeds the PLOP header 20 of a preceding downstream MU-MIMO data frame set. Four data PPDUs 1, 2, 3, 4 then succeed trigger information element 40, conveying downstream data to some set of clients. Again, these data PPDUs are padded out to the same length by padding 5, and are followed by Acknowledgements 6, 7, 8, 9 from the recipient clients. One SIFS time following the last Acknowledgement frame 9, the set of clients selected to perform upstream data transfer by trigger information element 40 transmit their OFDMA PPDUs 10, 11, 12, 13, padded as usual to the same length by padding 24, after which the AP returns a composite Acknowledgement 25.

The method of FIG. 6 has certain advantages over that of FIG. 4, in that trigger information element 40 (which is intended to be received and processed by all clients which are associated to the AP) is received earlier. It is therefore possible for clients to decode the data in trigger information element 40 sooner, and as a result make the determination of whether they are required to transmit an upstream frame in a succeeding OFDMA data burst much earlier. Clients that are not selected for upstream transmissions may then enter sleep mode or otherwise resort to power-saving measures, instead of having to receive and decode the entire downstream set of PPDUs 1, 2, 3, 4 in order to extract and process a trigger information element at the end of the set. This may increase battery life for battery-powered clients, and may also reduce the average amount of processing power required in a busy network.

Figure 7:
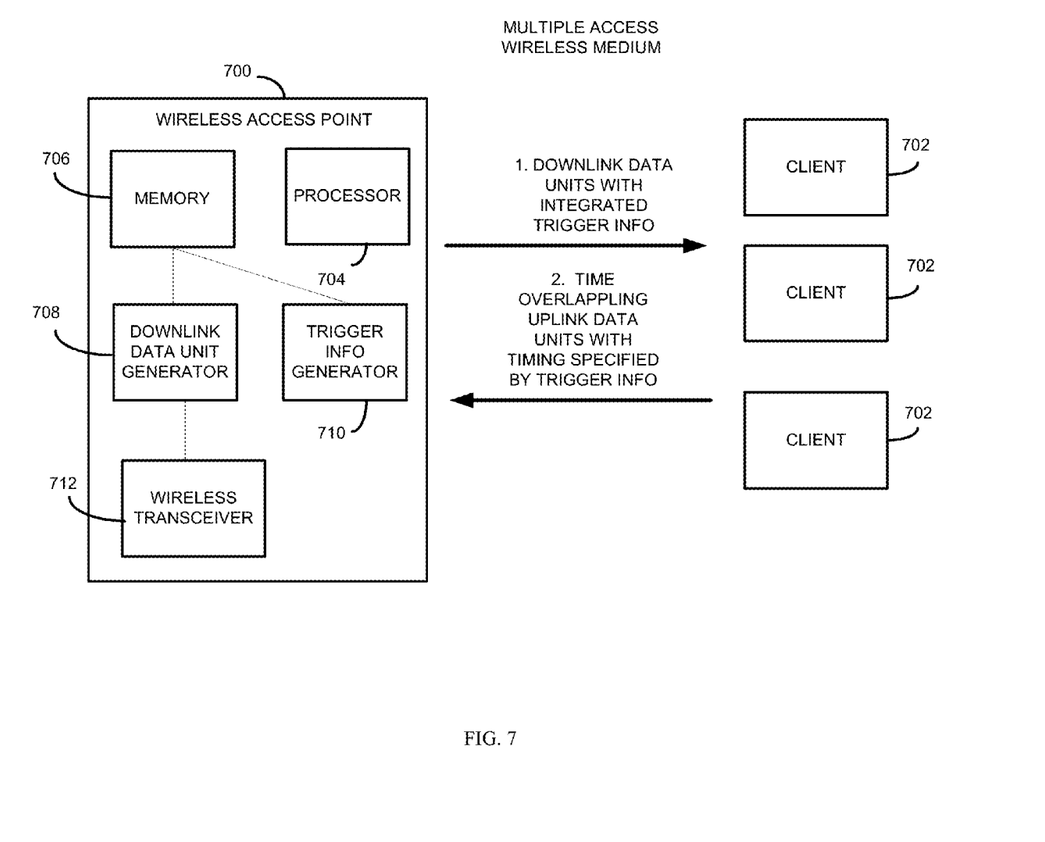
FIG. 7—block diagram of system for trigger information exchange for multiple access wireless communications according to an embodiment of the subject matter described herein.

FIG. 7 is a block diagram illustrating an exemplary system for communicating trigger information for multiple access uplink wireless communications according to an embodiment of the subject matter described herein. Referring to FIG. 7, a wireless access point 700 communicates with a plurality of clients 702 over a multiple access wireless medium. In one embodiment, wireless access point 700 is an MU-MIMO wireless access point that uses orthogonal frequency division multiple access (OFDMA) communications to communicate with clients 702. Clients 702 may be any suitable devices that can receive and decode the MU-MIMO OFDMA communications from access point 700. For example, clients 702 may be mobile handsets, tablet or laptop computers, or any other device with MU-MIMO OFDMA communications capabilities.

In the illustrated example, wireless access point 700 includes a processor 704 and a memory 706. Processor 704 may be a general purpose micro-processor or the processing engine of a special purpose ASIC or FPGA. Similarly, memory 706 may be stand alone RAM and/or ROM or on-chip memory. Wireless access point 700 includes a downlink data unit generator 708 that generates the downlink data units to be transmitted to clients 702. Downlink data unit generator 708 may generate the PPDUs illustrated in FIGS. 4 and 6. Wireless access point 700 also includes a trigger information generator 710 for generating the trigger information to be inserted in the downlink data units. Wireless access point 700 further includes a wireless transceiver 712 for transmitting the downlink data units, including the trigger information, to clients 702. Wireless transceiver 712 also receives time overlapping uplink data units with timing specified by the trigger information from clients 702.

Figure 8:
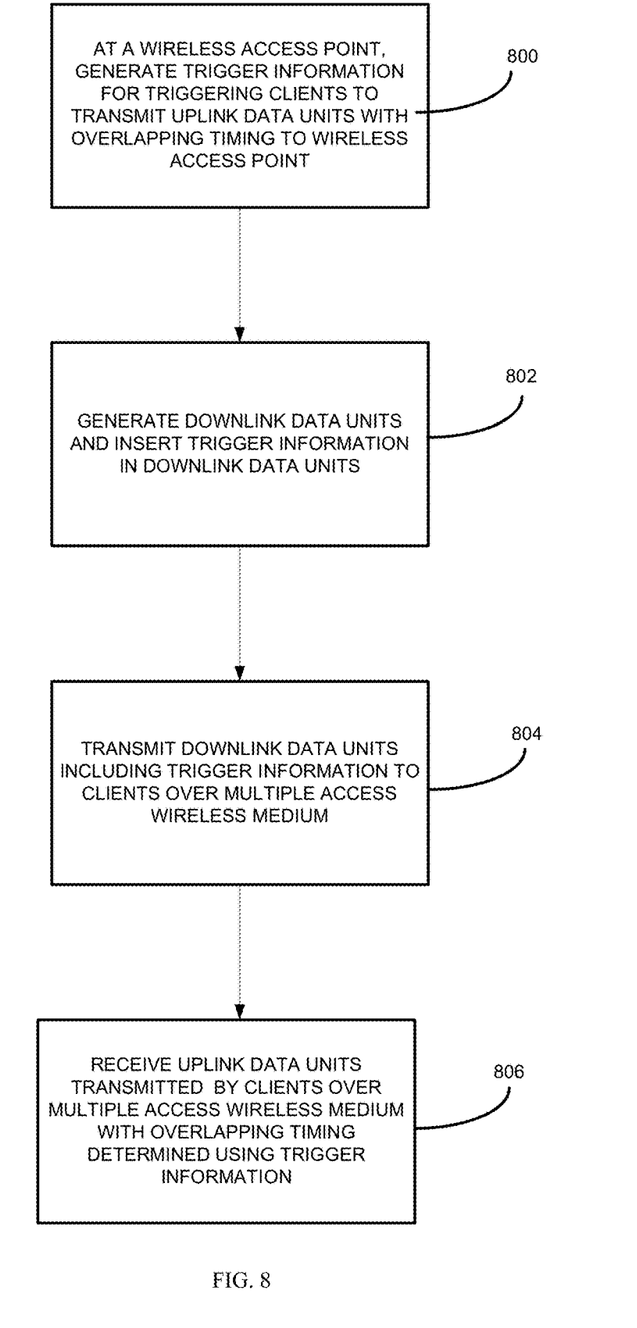
FIG. 8—flow chart of process for trigger information exchange for multiple access wireless communications according to an embodiment of the subject matter described herein.

FIG. 8 is a flow chart illustrating an exemplary process for communicating trigger information for multiple access uplink wireless communications according to an embodiment of the subject matter described herein. Referring to FIG. 8, step 800, a wireless access point generates trigger information for triggering clients to transmit uplink data units with overlapping timing to the wireless access point. For example, trigger information generator 710 illustrated in FIG. 7 may generate trigger information, as illustrated in FIG. 5, for triggering clients 702 to communicate PPDUs 1-4 to access point 700 with overlapping timing, as described above.

In step 802, the wireless access point generates downlink data units and inserts the trigger information in the downlink data units. For example, downlink data unit generator 708 may generate PPDUs 1, 2, 3, and 4 to be transmitted to clients 702. Downlink data unit generator 708 may insert the trigger information in the downlink data units, for example, at the end of the data units, as illustrated in FIG. 4 or at the beginning of the data units, as illustrated in FIG. 6.

In step 804, the downlink data units including the trigger information are transmitted to the clients over the multiple access wireless medium. For example, wireless transceiver 712 illustrated in FIG. 7 may transmit PPDUs 1-4 with the trigger information, as illustrated in FIG. 4 or FIG. 6 to clients 702.

In step 806, uplink data units are received from the clients over the multiple access wireless medium with overlapping timings determined using the trigger information. For example, wireless transceiver 712 may receive PPDUs 10, 11, 12, and 13 transmitted over the wireless medium with overlapping timings, as illustrated in FIG. 4 or FIG. 6.

Thus, by triggering clients to transmit uplink data units over a multiple access communications medium with overlapping timings, the trigger information generator described herein improves the utilization of the multiple access wireless medium by increasing throughput in uplink communications. Such increase throughput increases the efficiency of OFDMA communications, by allowing more information to be transmitted in the uplink direction per unit time. Other embodiments and applications of this arrangement may be apparent to persons skilled in the art.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

The invention claimed is:

1. A method for communicating trigger information for time overlapping multiple access uplink wireless communications, the method comprising:
    at a wireless access point including at least one processor:
        generating trigger information for triggering clients to transmit uplink data units with overlapping timing to the wireless access point over a multiple access wireless medium;
        generating an orthogonal frequency division multiple access (OFDMA) frame including a physical layer convergence protocol (PLCP) header and a plurality of downlink PLCP data units (PPDUs) and inserting the trigger information in the OFDMA frame, wherein inserting the trigger information in the downlink OFDMA frame includes inserting the trigger information as a trigger information element without a frame header or a frame trailer, immediately following the PLCP header, and before the PLCP data units in the OFDMA frame, wherein the trigger information element includes a common data block and a plurality of per client data blocks, the common data block carrying a transmit opportunity duration and the per-client data blocks each carrying client-specific transmit control data and per-client parameters;
        transmitting the downlink data units including the trigger information to the clients over the multiple access wireless medium;
        receiving acknowledgements from the clients in response to the downlink data units; and
        receiving, after the acknowledgments, the uplink data units transmitted by the clients over the multiple access wireless medium with overlapping timing determined using the trigger information, wherein the uplink data units comprise physical protocol data units transmitted separately from the acknowledgments.

2. The method of claim 1 wherein the plurality of downlink data units include a plurality of physical layer protocol data units.

3. The method of claim 1 wherein the wireless access point includes a multi-user multiple input multiple output (MU-MIMO) wireless access point.

4. The method of claim 1 wherein the clients use OFDMA communications to transmit the uplink data units to the wireless access point.

5. The method of claim 4 wherein the trigger information triggers the clients to simultaneously initiate transmission of the uplink data units to the wireless access point.

6. A system for communicating trigger information for time overlapping multiple access uplink wireless communications, the system comprising:
    a wireless access point including:
        at least one processor:
            a trigger information generator implemented by the at least one processor for generating trigger information for triggering clients to transmit uplink data units with overlapping timing to the wireless access point over a multiple access wireless medium;
            a downlink data unit generator implemented by the at least one processor for generating an orthogonal frequency division multiple access (OFDMA) frame including a physical layer convergence protocol (PLCP) header and a plurality of downlink PLCP data units (PPDUs) and inserting the trigger information in the OFDMA frame, wherein inserting the trigger information in the downlink OFDMA frame includes inserting the trigger information as a trigger information element without a frame header or a frame trailer, immediately following the PLCP header, and before the PLCP data units in the OFDMA frame, wherein the trigger information element includes a common data block and a plurality of per client data blocks, the common data block carrying a transmit opportunity duration and the per-client data blocks each carrying client-specific transmit control data and per-client parameters; and
        a wireless transceiver for transmitting the downlink data units including the trigger information to the clients over the multiple access wireless medium, for receiving acknowledgements from the clients in response to the downlink data units, and for receiving, after the acknowledgments, the uplink data units transmitted by the clients over the multiple access wireless medium with overlapping timing determined using the trigger information, wherein the uplink data units comprise physical protocol data units transmitted separately from the acknowledgments.

7. The system of claim 6 wherein the wireless access point includes a multi-user multiple input multiple output (MU-MIMO) wireless access point.

8. The system of claim 6 wherein the clients use OFDMA communications to transmit the uplink data units to the wireless access point.

9. The system of claim 8 wherein the trigger information triggers the clients to simultaneously initiate transmission of the uplink data units to the wireless access point.

10. A non-transitory computer readable medium having stored therein executed instructions that when executed by the processor of a computer control the computer to perform steps comprising:
    at a wireless access point including at least one processor:
        generating trigger information for triggering clients to transmit uplink data units with overlapping timing to the wireless access point over a multiple access wireless medium;
        generating an orthogonal frequency division multiple access (OFDMA) frame including a physical layer convergence protocol (PLCP) header and a plurality of downlink PLCP data units (PPDUs) and inserting the trigger information in the OFDMA frame, wherein inserting the trigger information in the OFDMA frame includes inserting the trigger information as a trigger information element without a frame header or a frame trailer, immediately following the PLCP header, and before the PLCP data units in the OFDMA frame, wherein the trigger information element includes a common data block and a plurality of per client data blocks, the common data block carrying a transmit opportunity duration and the per-client data blocks each carrying client-specific transmit control data and per-client parameters;

transmitting the downlink data units including the trigger information to the clients over the multiple access wireless medium;

receiving acknowledgements from the clients in response to the downlink data units; and receiving, after the acknowledgments, the uplink data units transmitted by the clients over the multiple access wireless medium with overlapping timing determined using the trigger information, wherein the uplink data units comprise physical protocol data units transmitted separately from the acknowledgments.

* * * * *